No. 635,288. Patented Oct. 24, 1899.
G. G. BARRET.
MANUFACTURE OF JAWS FOR JAW RODS OR JAW BOLTS.
(Application filed Jan. 4, 1899.)
(No Model.) 2 Sheets—Sheet 1.

Witnesses:
D. W. Edelin.
M. J. Tuhman.

Inventor:
Geo. G. Barret.
By Stebbins & Wright.
attys

THE NORRIS PETERS CO., PHOTO-LITHO., WASHINGTON, D. C.

No. 635,288. Patented Oct. 24, 1899.
G. G. BARRET.
MANUFACTURE OF JAWS FOR JAW RODS OR JAW BOLTS.
(Application filed Jan. 4, 1899.)
(No Model.) 2 Sheets—Sheet 2.

Witnesses:
D. W. Edelin.
M. J. Tubman.

Inventor:
Geo. G. Barret.
By Stebbins & Wright.
attys

UNITED STATES PATENT OFFICE.

GEORGE G. BARRET, OF PATERSON, NEW JERSEY.

MANUFACTURE OF JAWS FOR JAW-RODS OR JAW-BOLTS.

SPECIFICATION forming part of Letters Patent No. 635,288, dated October 24, 1899.

Application filed January 4, 1899. Serial No. 701,104. (No model.)

*To all whom it may concern:*

Be it known that I, GEORGE G. BARRET, a citizen of the United States, residing at Paterson, in the county of Passaic and State of New Jersey, have invented a certain new and useful Method of Manufacturing Jaws for Jaw-Rods or Jaw-Bolts, of which the following is a specification.

The object of my invention is the production of a jaw-rod or jaw-bolt with a U-shaped split head which shall have the jaws made of two pieces of metal welded together and formed solid and with a sufficient quantity of metal at the neck or meeting-point of the jaws which shall be stronger, less liable to elongate, easier made, and cheaper in first cost than others heretofore produced and which withal shall constitute a superior rod or bolt adapted for use in the construction of boilers, bridges, brake-riggings, &c.

To attain the object and end above cited, I have devised a new method or process of manufacturing the jaws for such jaw-rods or jaw-bolts, which method is hereinafter fully set forth specifically in one of its modes and one slight modification thereof for the purpose of illustrating the application of the principle.

The accompanying drawings will aid in the exposition and understanding of the several steps of my new method of procedure.

Figure 1:
Figure 2:
Figure 3:
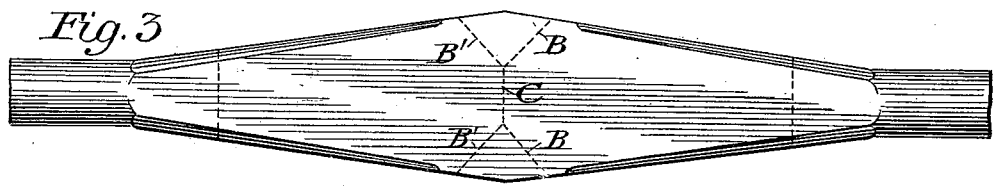
Figure 4:
Figure 5:
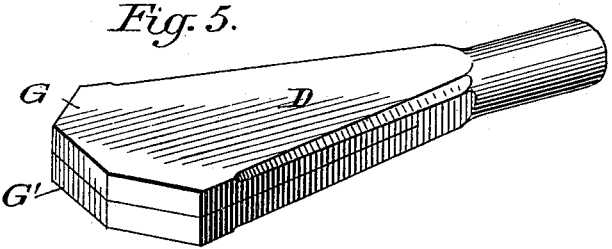
Figure 6:
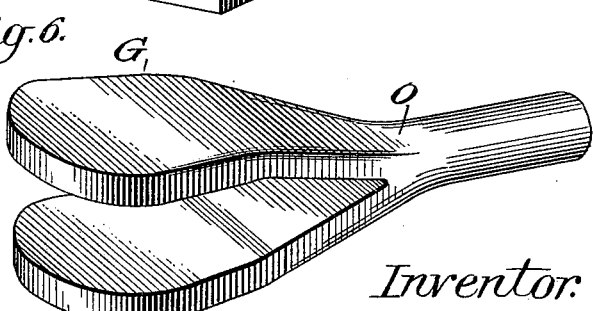
Figure 7:
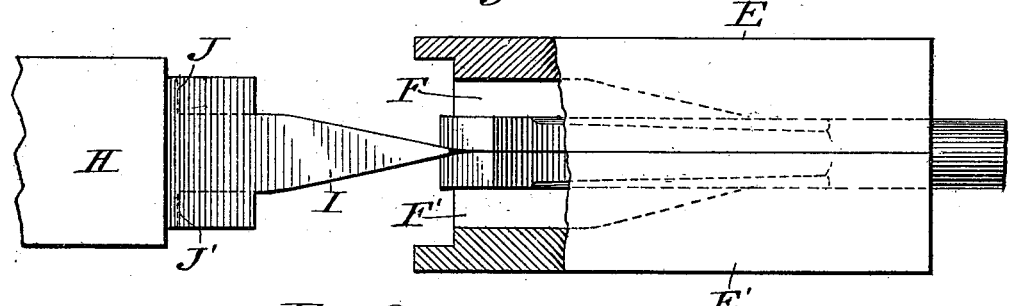
Figure 8:
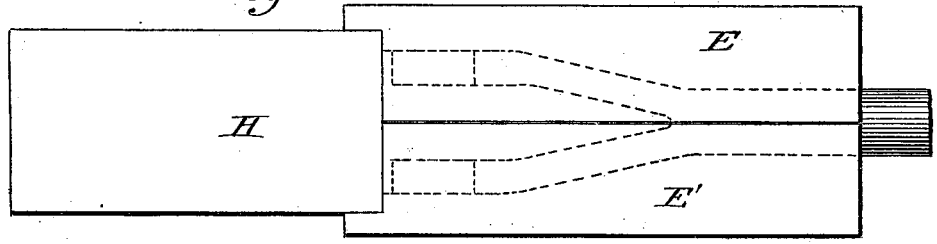
Figure 9:
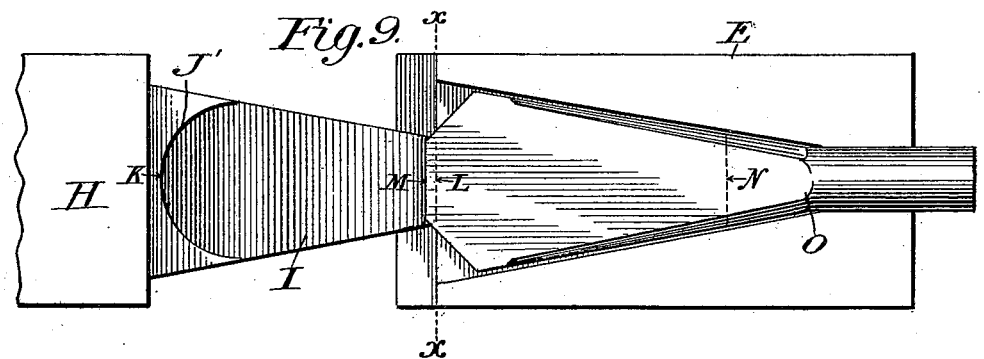

Figure 1 is an edge view of two pieces of iron or other metal placed parallel and with the face of one in contact with the face of the other. Fig. 2 is a plan view of the top piece shown in Fig. 1. Fig. 3 illustrates the plates or pieces as they appear after having been drawn down at a welding heat. Fig. 4 is an edge view of Fig. 3. Fig. 5 is a view of one half of Fig. 3 as it appears when severed from the other half on the dotted lines. Fig. 6 shows the jaws open and finished with the exception of the formation of the holes therein. Figs. 7, 8, and 9 illustrate gripping and upsetting or shaping dies used in the carrying out of my improved method or process.

First. I select two pieces of iron of suitable shape and dimensions—such, for example, as designated by A A' in Figs. 1 and 2—and having placed them parallel and face to face subject both to a temperature which will insure a welding heat.

Second. I weld the ends of the plates or pieces together and draw them down under the hammer or in any other way till they taper from the middle toward the ends or approximate the shape shown in Fig. 3. The plates are welded together only at the ends, the middle portions between the extreme dotted lines in Fig. 3 and as shown by the full line in Fig. 4 being in face-to-face contact or some distance apart, as the case may be, and not welded.

Third. I cut the plates, as fashioned in Fig. 3, apart on the lines B B' C or on a curved line, if preferred, each half B when severed being somewhat of the shape illustrated in Fig. 5.

Fourth. I place a part D when raised to the proper temperature between two duplicate gripping-dies E E', each having cavities F F' so shaped that the lateral edges of the said part D when gripped will fit the sides of the dies and the fashioned blank be held practically immovable, with the free or unwelded ends of the plates or jaws G G' slightly projecting beyond the line $x$ $x$.

Fifth. I finally advance the upsetting or shaping die H, which is wedge-shaped at I and curved at the shoulders J J', to the relative position between the jaws G G'. (Shown in dotted lines, Fig. 8.)

Inasmuch as I have intentionally made the length of the wedge I, measured from K to L, less than the length of the jaws G G' from M to N, Fig. 9, it is obvious that the curved shoulders J J' will first engage the projecting ends of the jaws, and, furthermore, that when the wedge and die are still farther advanced and seated the metal of the ends of the jaws will be upset to a curved shape and the mass thereof forced inwardly and longitudinally, so that the amount of iron at the point O of the neck will be increased in quantity and also be in a state or condition of great density. As the lateral edges of the part D fit the edges of the dies no buckling of the jaws is possible, and consequently the mass of metal will be forced longitudinally only and not laterally.

As a result of the process I have the product illustrated in Fig. 6, which is solid and strong at the neck O and not split or relatively weak, as is usually the case when such jaws are made by the common and well-known methods. Moreover, it fulfils all the conditions hereinbefore set forth as the object of my invention.

As a modified mode of carrying out my process of manufacture I may select two suitable pieces of iron or other metal, and after heating weld them together at one end only, draw them down to the approximate shape, (shown in Fig. 5,) and finally subject the same to the action of dies, as above described.

It is to be noted that while I have specifically explained only one mode of performing my improved process and one slight modification thereof I do not thereby intend to exclude from the scope of my claims slight, immaterial, or colorable variations or changes in the number or succession of the steps to be taken. For instance, the plates may be made of a tapering shape from the middle toward the ends or from one end toward the other before welding the ends, the gripping-dies may be divided in a plane at right angles to the line of division shown, the jaws be opened and the metal concentrated at the neck of the jaws by advancing the gripping-dies onto the shaping-die and wedge, and the stem or part of the rod or bolt adjacent the neck be fashioned to any desired shape before or after the opening of the jaws by the die or otherwise. Again, the shape of the die may be changed when it is desirable to give the jaws a different shape or the neck a different size or size and shape. All such and other modifications I shall regard as unsubstantial and as embodying my invention.

What I claim as new, and desire to secure by Letters Patent, is—

1. The method of forming jaws for jaw-rods or jaw-bolts consisting in: first, welding together the parallel ends of two pieces of metal; second, forcing apart the free or unwelded ends of the two pieces so as to form jaws; and third, supporting the fashioned blank between dies so as to prevent any lateral motion or buckling, and upsetting the metal longitudinally and making it solid and dense at the neck or meeting-point of the jaws; in substance as set forth.

2. The method of forming jaws for jaw-rods or jaw-bolts consisting in: first, welding together the extreme parallel ends of two pieces of metal, leaving the middle portions unwelded; second, cutting the two welded pieces apart at the center; third, forcing apart the free unwelded ends of a part as severed to form jaws; and fourth, upsetting the metal longitudinally and making it solid and dense at the neck or meeting-point of the jaws; in substance as set forth.

3. The method of forming jaws for jaw-rods or jaw-bolts solid at the neck consisting in: first, welding together one pair of the ends of two pieces of metal; second, drawing down the welded ends to a tapering shape; third, forcing apart the unwelded parallel ends to form jaws; and, fourth, upsetting the metal of the jaws longitudinally; in substance as and for the purpose specified.

In testimony whereof I affix my signature in presence of two witnesses.

GEORGE G. BARRET.

Witnesses:
ROLAND W. LOVELAND,
H. A. DIFFENDAFER.